J. E. JOHNSON.
GAGE.
APPLICATION FILED JUNE 17, 1915.
1,250,586.
Patented Dec. 18, 1917.
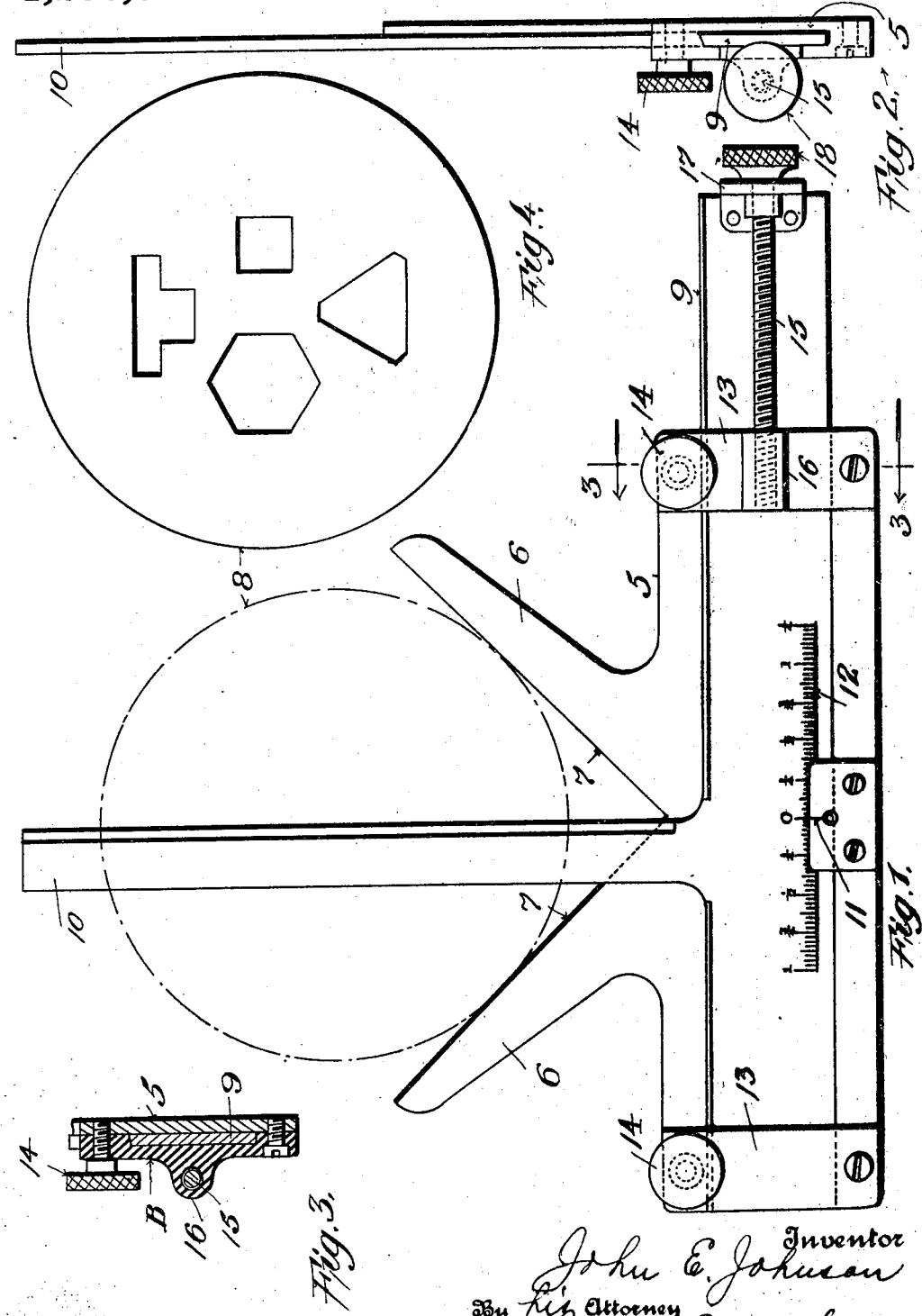

UNITED STATES PATENT OFFICE.

JOHN E. JOHNSON, OF BROOKLYN, NEW YORK.

GAGE.

1,250,586. Specification of Letters Patent. Patented Dec. 18, 1917.

Application filed June 17, 1915. Serial No. 34,627.

*To all whom it may concern:*

Be it known that I, JOHN E. JOHNSON, a citizen of the United States, residing at Brooklyn, county of Kings, State of New York, have made a certain new and useful Invention in Gages, of which the following is a specification.

This invention relates to gages and particularly to tools of this nature designed to lay out work on a flat round disk or surface.

The object of the invention is to provide a gage which is simple in structure, economical to manufacture and efficient in operation.

A further object of the invention is to provide a gage for use in laying out work with accuracy on a flat round disk or surface or to mark lines, diagrams or designs on such surface and any desired distance from the center of the disk or on lines parallel to the diameter of such disk or surface.

Other objects of the invention will appear more fully hereinafter.

The invention consists substantially in the construction, combination, location and relative arrangement of parts all as will be more fully hereinafter set forth, as shown in the accompanying drawing, and finally pointed out in the appended claim.

Referring to the accompanying drawing:—

Figure 1 is a view in elevation of a gage embodying the principles of my invention.

Fig. 2 is an end view of the same.

Fig. 3 is a view in section on the line 3, 3, Fig. 1.

Fig. 4 is a diagram illustrating the work capable of being performed in the use of a gage embodying my invention.

Machinists, mechanics, and others have heretofore experienced considerable difficulty in properly and accurately laying out work, diagrams, designs or the like on a flat surface of a cylindrical disk and particularly along lines which are required to be at definite distances from the center of the disk and parallel to diametric lines of the disk. Also in laying out centers on such round surfaces, or points on the ends of a shaft where cam or eccentric action is required. Such difficulty has arisen by reason of the fact that no adequate tool for securing the desired measurements of distances off center of the disk or round surfaces has been available for the purpose. It is among the special purposes of my present invention to provide a gage of exceedingly simple structure by which lines or other points may be accurately laid off either diametrically through the center of the disk or at accurately adjusted distances from and parallel to such diametric line.

In carrying out my invention I provide a base 5 having laterally extending arms 6 at one edge thereof, said arms having surfaces 7 formed at an angle of exactly 90°, to each other. These surfaces are designed to straddle the work 8, thereby locating the center of a round or circular disk in a line which bisects the angle between the surfaces 7 of the arms 6. Applied to the side surface of the base 5 is a slide plate 9 arranged to move in a straight line at right angles to a line bisecting the angle of the surfaces 7. This slide plate has formed integrally with it a straight edge member 10, which extends from one edge and at exactly right angles to the line of endwise movement of said plate 9. The base 5 is provided with an indicating point 11, preferably located in the line of the bisector of the angular surfaces 7 and consequently in line with the geometric center point of the round or circular disk or work 8. Coöperating with this mark 11 is a scale indicated at 12 on the side of the plate 9. By suitably shifting the plate 9 endwise to any desired position as measured by the scale 12 and mark 11, the straight edge 10 is correspondingly shifted with absolute accuracy to any desired position off center with reference to the disk and parallel to the bisector of the angle between surfaces 7 thereby enabling the desired lines, diagrams, designs, or points off center with respect to the disk, and on either side of the center thereof, to be laid off or marked upon the surface of the disk.

The plate 9 may be held upon the base 5 and guided in its rectilinear adjustments in any suitable or convenient manner. I have shown straps 13 which are arranged at the ends of the base 5 and engaged over the plate 9, and releasably secured to the base plate in any suitable manner, as, for instance, by thumb nuts 14. By loosening the nuts 14 plate 9 may be shifted to the desired extent and in either direction and then clamped and held in adjusted position by tightening up of the thumb nuts 14.

The plate 9 may be shifted or moved in any suitable or convenient manner to secure the desired adjustments thereof.

I have shown a simple arrangement for this purpose wherein an adjusting screw 15 is tapped through a lug 16 formed on one of the clamp straps 13, said screw 15 being held in a collar 17 carried by the end of plate 9. The adjusting screw 15 is also provided with a thumb piece 18 by which said screw may be rotated to secure the desired adjustment of said plate.

In Fig. 4 I have indicated various designs of work laid out or diagrammed upon the surface of a circular disk by the use of a gage embodying my invention and from an inspection of which it will be observed various designs may be accurately laid out on the surface of a round disk or other similar piece of work in lines parallel to but off center from diametric lines to such surface.

The advantages derived from the use of a scale embodying my invention are many and obvious. Not only may work be laid out on circular surfaces in off center relation with respect to such surface with absolute accuracy but also with expedition thereby saving time in laying out the work, in locating eccentric pivot axes for shafts, cam disks or the like and for many other purposes.

Having now set forth the object and nature of my invention and a structure embodying the principles thereof, what I claim as new and useful and of my own invention and desire to secure by Letters Patent, is, A gage comprising a base member having lateral surfaces arranged at a right angle to each other, and a plate member placed flatwise against the base member and arranged to move endwise in a straight line at right angles to the bisector of said first mentioned angle, said plate member having a straight edge portion formed integrally therewith and extending from one edge and at right angles to the length of said plate, and means carried at the ends of the base member to engage and form a guide for the plate member in the endwise movement of the latter, and to clamp and hold the same in adjusted position.

In testimony whereof I have hereunto set my hand in the presence of the subscribing witnesses, on this 14th day of June, A. D., 1915.

JOHN E. JOHNSON.

Witnesses:
M. A. GRAEVE,
S. E. DARBY.

Copies of this patent may be obtained for five cents each, by addressing the "Commissioner of Patents, Washington, D. C."